United States Patent [19]

Murphy

[11] Patent Number: 5,368,073
[45] Date of Patent: Nov. 29, 1994

[54] HYDROPNEUMATIC PRESSURE VESSEL HAVING AN IMPROVED DIAPHRAGM ASSEMBLY

[75] Inventor: James C. Murphy, Chardon, Ohio

[73] Assignee: Essef Corporation, Chardon, Ohio

[21] Appl. No.: 132,845

[22] Filed: Oct. 7, 1993

[51] Int. Cl.⁵ ............................................. F16L 55/04
[52] U.S. Cl. ........................................ 138/30; 138/26
[58] Field of Search ................... 138/26, 30; 220/85 B

[56] References Cited

U.S. PATENT DOCUMENTS

| | | | |
|---|---|---|---|
| 3,929,163 | 12/1975 | Schön | 138/30 |
| 4,595,037 | 6/1986 | LeBreton et al. | |
| 4,667,841 | 5/1987 | Belle | 138/30 |
| 4,777,982 | 10/1988 | Borowitz et al. | 138/30 |

FOREIGN PATENT DOCUMENTS 2640018  6/1990  France ................................. 138/30

*Primary Examiner*—James E. Bryant, III
*Attorney, Agent, or Firm*—Pearne, Gordon, McCoy & Granger

[57] ABSTRACT

A hydropneumatic filament-wound pressure vessel is disclosed. The vessel includes a split tank closure and diaphragm assembly comprising a pair of cup-shaped plastic tank liners having cylindrical sidewall portions terminating in circular open mouth portions. A cylindrical ring is interposed between the open mouths of the liners and is sealed to the liners by a fusion welding operation. A cup-shaped elastomeric diaphragm is sealed to the cylindrical ring and separates the interior of the vessel into a pair of pressure chambers. The outer surface of the tank is helically wound with a resin-impregnated continuous filament.

4 Claims, 2 Drawing Sheets

HYDROPNEUMATIC PRESSURE VESSEL HAVING AN IMPROVED DIAPHRAGM ASSEMBLY

BACKGROUND OF THE INVENTION

This invention relates to a filament-wound hydropneumatic accumulator tank containing a flexible diaphragm which separates the interior of the tank into a compressible gas-containing chamber and a liquid-containing chamber.

Accumulator or pressure-controlled devices, according to this invention, are especially adapted for liquid dispensing systems and, particularly, for water systems dependant upon well water, a pump and, because of intermittent use, an intermittent source of pressurization for the system. A simple prior art system for accumulating the pressurization of a well water system, for example, in a dwelling, comprises a pipe extending into the underground water supply, a pump, and a reservoir tank. Frequently, the tank is a metal container having no valve and in which air is merely trapped. In some insulations, a valve, such as a conventional tire valve, may be positioned at or near the top of the container, and an outlet may be provided near the bottom. In many cases, a diaphragm is not provided, but it is highly desirable to separate the air from the water and the tank since air will dissolve in the water and may create a "white water" problem at the taps. A charge of air is introduced in the tank, usually occupying about one-half of the volume of the tank and to a pressure sufficient to force water into the plumbing system connected thereto. A pressure switch senses the pressure within the tank or in the water line, as the case may be, and operates between limits, for example, between twenty and forty PSI. If the pressure falls below twenty PSI, the pump is activated and continues to operate until the pressure in the system is built up to forty PSI, causing the pump to be turned off by the pressure switch.

Typical prior art accumulators include a pressure vessel having an expansible bag therein which may be either an inflatable bag which stretches upon the introduction of air, or which merely unfolds as the air volume increases, or the expansible bag may unfold and also expand. An air valve extends through one end of the tank, and an inlet and outlet aperture is provided at the other end of the tank for fluid communication with the water system. As water is pumped into the tank, the bag is forced upwardly by the incoming water.

Separator bags or diaphragms in pressure tanks are either diaphragm-type separators peripherally sealed, or otherwise attached to the sidewall of the tank, usually at an assembly seam wherein the tank is formed by a pair of cup-shaped halves or comprises a removable cell which may be removed and replaced upon failure. Both arrangements have advantages and disadvantages. The primary advantage of a diaphragm-type separator is that the diaphragm may be constructed from a relatively heavy gauge, plastic, or rubber, and may be shaped to conform to the cross-section of the tank to eliminate stretching. This arrangement, however, involves the dual problem of providing a pressure-tight seal between the mating halves of the pressure vessel and between the sidewall of the vessel and the diaphragm. For the sake of economy, attempts have been made to combine the seal between the tank halves and the seal between the diaphragm and the sidewall in a single assembly. This arrangement, however, has not been entirely successful, and tank leakage has resulted. Furthermore, these arrangements usually involve protruding flanges and clamps on the exterior of the tank which interfere with attempts to helically wind the tank for added reinforcement.

One attempt to overcome the problem of providing a pressure-tight seal between the mating halves of a pressure vessel and between the sidewall of the vessel and the diaphragm is set forth in U.S. Pat. No. 4,595,037. According to that patent, a filament-wound, non-metallic pressure vessel includes an assembly ring which provides a pressure-tight joint between the diaphragm and the sidewall of one of the liners and provides a seal with respect to the other liner. The assembly comprises cup-shaped liners, and the assembly ring provides a smooth exterior surface which may be filament-wound, employing conventional winding techniques. The liners form a dovetail joint with the ring and respectively trap an O-ring and a bulbous portion of the diaphragm between recessed portions of the liner and a surface of the ring to seal the interior of the tank. The dovetail connection between the cup-shaped liners and the ring is a dynamic seal in the sense that these elements are not physically joined by any mechanism other than the filament winding which retain the elements in an assembled condition. The seals, which include the aforementioned O-ring and the bulbous portion of the diaphragm, are relied upon to prevent leakage of the pressure vessel.

The ability of an O-ring to perform its sealing function depends, to a large degree, on its position between the elements to be sealed. In the particular arrangement shown in U.S. Pat. No. 4,595,037, the O-ring performs its intended function. However, since the seal and the assembly is dynamic, pressurization of the pressure vessel causes the liner walls to flex and change the dimensions of the seat for the 0-ring, thus creating a potential leakage situation and/or extrusion of the O-ring into the sealed joint. Moreover, the bulbous seal portion of the diaphragm merely approximates the configuration of an O-ring and may not form an adequate seal.

SUMMARY OF THE INVENTION

This invention is an improvement of such prior art devices. According to the present invention, a hydropneumatic filament-wound pressure vessel having a split tank closure and diaphragm assembly comprises cup-shaped plastic liners which terminate in circular open mouth portions. A circular ring is interposed between the liners and is fused to the open mouth of each liner to form a fluid-tight seal within the liners. The ring is provided with a flexible diaphragm which is, preferably, a thermoplastic rubber and which is cup-shaped to normally nest within one of the cup-shaped liners so that it is not subject to appreciable stretching upon pressurization. The diaphragm has an open mouth which is fused to the inside surface of the cylindrical ring to provide a sealed separation between water and air contained within said pressure vessel. The pressure vessel is helically-wound with a resin-impregnated continuous filament winding.

DETAILED DESCRIPTION OF THE INVENTION

Figure 1:
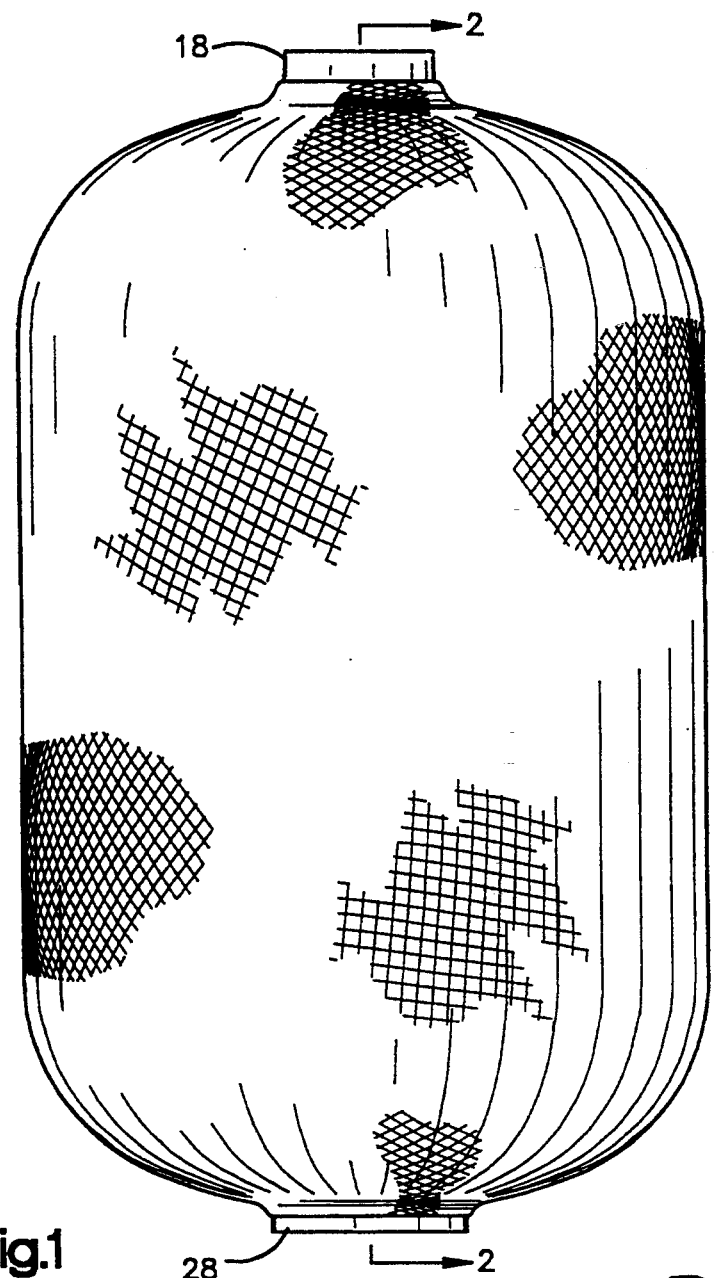
FIG. 1 is an elevational view of a hydropneumatic filament-wound pressure vessel, according to this invention.
Figure 3:
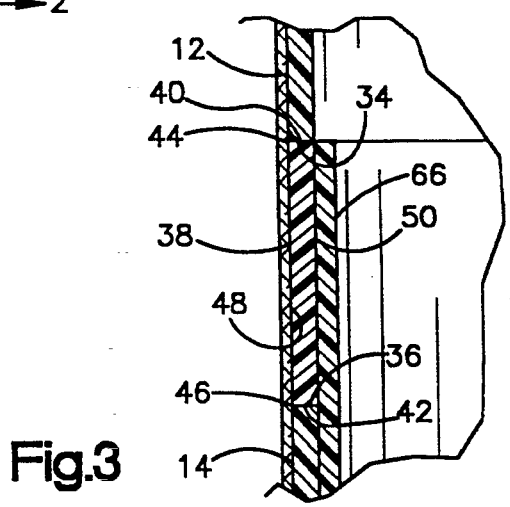
FIG. 3 is an enlarged fragmentary cross-sectional view showing details of the seal.
Figure 2:
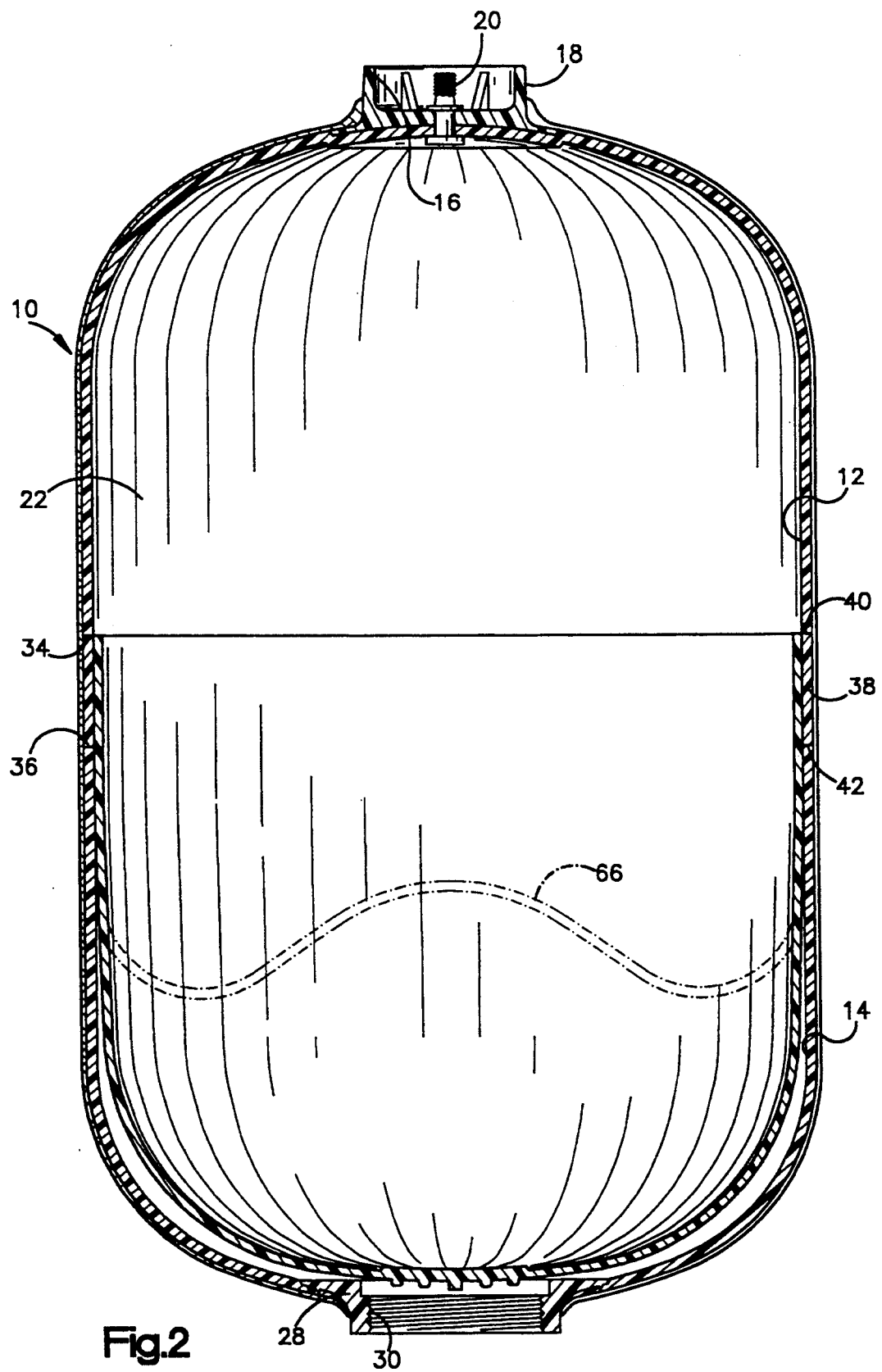
FIG. 2 is a cross-sectional view, the plane of the section being indicated by the line 2—2 in FIG. 1.

Referring now to the drawings, there is illustrated an accumulator vessel or tank 10 which is formed by cup-shaped thermoplastic tank shelves or liners 12 and 14. The liners 12 and 14 are, preferably, injection-molded, but may be formed by other molding techniques. Moreover, the liners 12 and 14 may be formed by techniques involving the use of fibrous reinforcing forms and thermosetting resin systems.

The liner 12 may be provided with a circular recess 16 which receives a cup-shaped plastic valve guard 18 which may be cemented within the recess 16. A conventional one-way check valve, such as a conventional tire valve 20, is provided within the guard 18 and extends through the guard 18 and the liner 12 for fluid communication with a pressure chamber 22 within the tank 10.

The cup-shaped liner 14 is molded about a tank end fitting 28 which is provided with a threaded access opening 30. The fitting 28 may be provided as an insert during the injection molding operation and fused to the cup-shaped liner 14 during that operation.

The liners 12 and 14 terminate in circular open mouth portions which have opposed annular end faces 34 and 36, respectively, and the liners 12 and 14 are retained in mouth-to-mouth apposition to form a sealed container by a cylindrical mounting ring 38. The cylindrical ring 38 has end faces 40 and 42 which are respectively fused to the faces 34 and 36 by fusion welds 44 and 46. The fusion welds 44 and 46 are accomplished by feeding a supply of plastic in rod form to the tip of a plastic extrusion welder gun. The tip of the gun incorporates a controlled heater that partially melts the joint to be welded. The plastic immediately adjacent the faces 34, 40, 42 and 36 partially melts together with the plastic welding rod to form a fused joint upon cooling of the assembly. The mounting ring 38 is defined by a cylindrical outer surface which corresponds to the outside diameter of the cylindrical sidewall portions of the liners 12 and 14. The ring 38 has an inside surface 48 which corresponds to the inside diameter of the cylindrical sidewall portions of the liners 12 and 14.

A stiffly flexible elastomeric thermoplastic injection-molded diaphragm 50 separates the pressure chamber 22 to form water and air cells within the tank 10. The diaphragm 50 is fused to the ring 38. To this end, the ring 38 may be mounted as an insert within the mold cavity of an injection-molding machine so that the hot, liquid plastic forming the diaphragm in the mold will contact and fuse with the ring 38. After the tank is assembled in the foregoing manner, the assembly is mounted in a conventional filament winding machine and, by employing conventional filament winding techniques, the entire outer surface of the tank is filament-wound in a helical pattern by resin-impregnated rovings, such as resin-impregnated continuous glass fibers 68.

Although the preferred embodiments of this invention have been shown and described, it should be understood that various modifications and rearrangements of the parts may be resorted to without departing from the scope of the invention as disclosed and claimed herein.

What is claimed is:

1. A hydropneumatic filament-wound pressure vessel having a split tank closure and diaphragm assembly comprising first and second cup-shaped plastic tank liners, said liners having oblate ellipsoidal end portions and cylindrical sidewall portions terminating in circular open mouth portions having opposed first and second annular end faces, a cylindrical ring having third and fourth annular end faces respectively fused to said first and second end faces to seal said liners into a unitary pressure vessel liner, said cylindrical ring having inside and outside surfaces having diameters corresponding to inside and outside diameters of said cylindrical sidewall portions of said liners, a stiffly flexible elastomeric cup-shaped diaphragm having an oblate ellipsoidal end portion and a cylindrical sidewall portion terminating in an open mouth, said diaphragm being nested within one of said liners and having a segmental area of its sidewall, adjacent said open mouth, fused to the inside surface of said cylindrical ring, and a resin-impregnated filament winding covering the liners and the outside surface of said ring cylindrical in a predetermined winding pattern.

2. A hydropneumatic filament-wound pressure vessel according to claim 1, wherein the opposed first and second annular end faces of said liners are extrusion-welded to the third and fourth annular end faces of said cylindrical ring.

3. A hydropneumatic filament-wound pressure vessel according to claim 1, wherein a diaphragm separates an interior cavity of said unitary pressure vessel liner into a pair of pressure chambers, means in said liner for connecting one of said pressure chambers to a source of pressurized air including a one-way check valve filtering means in said liner adapted to connect another one of said pressure chambers to a water source.

4. A hydropneumatic filament-wound pressure vessel according to claim 1, wherein said winding pattern is a helical pattern.

* * * * *

UNITED STATES PATENT AND TRADEMARK OFFICE
CERTIFICATE OF CORRECTION

PATENT NO. : 5,368,073

DATED : November 29, 1994

INVENTOR(S) : James C. Murphy

It is certified that error appears in the above-identified patent and that said Letters Patent is hereby corrected as shown below:

Column 4, line 39, "said ring cylindrical" should read
--said cylindrical ring--.

Column 4, line 51, after "valve" insert --,--.

Signed and Sealed this

Thirteenth Day of June, 1995

Attest:

BRUCE LEHMAN

Attesting Officer

Commissioner of Patents and Trademarks